United States Patent [19]
Iseyama

[11] Patent Number: 5,669,064
[45] Date of Patent: Sep. 16, 1997

[54] MOBILE METHOD AND APPARATUS FOR STANDBY CONTROL IN A COMMUNICATION SYSTEM

[75] Inventor: Takayuki Iseyama, Kawasaki, Japan

[73] Assignee: Fujitsu Limited, Kanagawa, Japan

[21] Appl. No.: 316,580

[22] Filed: Sep. 30, 1994

[30] Foreign Application Priority Data

Mar. 17, 1994 [JP] Japan .................... 6-047489

[51] Int. Cl.$^6$ .................................... H04B 7/26
[52] U.S. Cl. ............................ 455/517; 455/69
[58] Field of Search .................. 455/54.1, 88, 69, 455/70, 34.1, 34.2, 38.3, 126, 127, 33.1, 343, 35.1, 67.1, 226.1, 226.2

[56] References Cited

U.S. PATENT DOCUMENTS

| | | | |
|---|---|---|---|
| 4,996,715 | 2/1991 | Marui et al. | 455/33.1 |
| 5,212,823 | 5/1993 | Fujii et al. | 455/54.1 |
| 5,293,639 | 3/1994 | Wilson et al. | 455/17 |
| 5,428,815 | 6/1995 | Grube | 455/33.1 |
| 5,430,761 | 7/1995 | Bruckert et al. | 375/200 |

FOREIGN PATENT DOCUMENTS

| | | | |
|---|---|---|---|
| 0473465 | 3/1992 | European Pat. Off. | 455/343 |
| 332122 | 2/1991 | Japan . | |

*Primary Examiner*—Reinhard J. Eisenzopf
*Assistant Examiner*—Lee Nguyen
*Attorney, Agent, or Firm*—Helfgott & Karas, P.C.

[57] ABSTRACT

According to a first aspect of the invention, a reception level threshold value for standby control is determined on the basis of signaling information received from a base station and information concerning mobile unit reception performance, and standby control is performed by comparing a measured reception level with the reception level threshold value. According to a second aspect of the invention, signaling information containing a BER (bit error rate) threshold value is received from a base station, and standby control is performed by comparing a measured BER with the BER threshold value.

6 Claims, 11 Drawing Sheets

Fig. 3A

|  | 8 | 7 6 5 4 3 2 1 |  |
|--|---|---|---|
| 1ST OCTET |  | COMMUNICATION LEVEL 1 | --- FOR DIVERSITY-EQUIPPED TYPE |
| 2ND OCTET |  | COMMUNICATION LEVEL 2 | --- FOR NON-DIVERSITY TYPE |

Fig. 3B

|  | 8 | 7 6 5 4 3 2 1 |  |
|--|---|---|---|
| 1ST OCTET |  | COMMUNICATION OUT LEVEL 1 | --- FOR DIVERSITY-EQUIPPED TYPE |
| 2ND OCTET |  | COMMUNICATION OUT LEVEL 2 | --- FOR NON-DIVERSITY TYPE |

|  | 8 | 7 | 6 | 5 | 4 | 3 | 2 | 1 |  |
|--|---|---|---|---|---|---|---|---|---|
| 1ST OCTET |  | 0 | 1 | 1 | 0 | 0 | 1 | 1 | (7dBμ) |
| 2ND OCTET |  | 0 | 1 | 1 | 0 | 0 | 1 | 0 | (14dBμ) |

COMMUNICATION LEVEL

Fig. 3E

|  | 8 | 7 | 6 | 5 | 4 | 3 | 2 | 1 |  |
|--|---|---|---|---|---|---|---|---|---|
| 1ST OCTET |  | 0 | 1 | 1 | 0 | 0 | 0 | 1 | (5dBμ) |
| 2ND OCTET |  | 0 | 1 | 1 | 1 | 0 | 0 | 0 | (12dBμ) |

COMMUNICATION OUT LEVEL

Fig. 4A

|   | 8 | 7 | 6 | 5 | 4 | 3 | 2 | 1 |   |
|---|---|---|---|---|---|---|---|---|---|
| 1ST OCTET |   | COMMUNICATION REFERENCE RECEPTION LEVEL ||||||| |
| 2ND OCTET | COMMUNICATION LEVEL |||||||| FOR DIVERSITY-EQUIPPED TYPE |
| 3RD OCTET | COMMUNICATION LEVEL |||||||| FOR NON-DIVERSITY TYPE |

Fig. 4B

|   | 8 | 7 | 6 | 5 | 4 | 3 | 2 | 1 |   |
|---|---|---|---|---|---|---|---|---|---|
| 1ST OCTET |   | COMMUNICATION OUT REFERENCE RECEPTION LEVEL ||||||| |
| 2ND OCTET | COMMUNICATION OUT LEVEL |||||||| FOR DIVERSITY-EQUIPPED TYPE |
| 3RD OCTET | COMMUNICATION OUT LEVEL |||||||| FOR NON-DIVERSITY TYPE |

Fig. 4D

|   | 8 | 7 | 6 | 5 | 4 | 3 | 2 | 1 |   |
|---|---|---|---|---|---|---|---|---|---|
| 1ST OCTET |   | 0 | 1 | 1 | 0 | 0 | 1 | 1 | (7dBμ) |
| 2ND OCTET | 0 | 0 | 0 | 1 | 1 | 0 | 0 | 0 | (±0dBμ) |
| 3RD OCTET | 1 | 1 | 0 | 0 | 0 | 0 | 0 | 0 | (+7dBμ) |

COMMUNICATION LEVEL

|   | 8 | 7 | 6 | 5 | 4 | 3 | 2 | 1 |   |
|---|---|---|---|---|---|---|---|---|---|
| 1ST OCTET |   | 0 | 1 | 1 | 0 | 0 | 0 | 1 | (5dBμ) |
| 2ND OCTET | 0 | 0 | 0 | 1 | 1 | 0 | 0 | 0 | (±0dBμ) |
| 3RD OCTET | 1 | 1 | 0 | 0 | 0 | 0 | 0 | 0 | (+7dBμ) |

COMMUNICATION OUT LEVEL

Fig.5A

| | 8 | 7 | 6 | 5 | 4 | 3 | 2 | 1 | |
|---|---|---|---|---|---|---|---|---|---|
| 1ST OCTET | 1 | 0 | 0 | 1 | 0 | 0 | 0 | 0 | ---FLAG |
| 2ND OCTET | | 0 | 1 | 1 | 0 | 0 | 1 | 1 | ---FOR DIVERSITY-EQUIPPED TYPE |
| 3RD OCTET | | 0 | 1 | 1 | 0 | 0 | 1 | 0 | ---FOR NON-DIVERSITY TYPE |

Fig.5B

| | 8 | 7 | 6 | 5 | 4 | 3 | 2 | 1 | |
|---|---|---|---|---|---|---|---|---|---|
| 1ST OCTET | 1 | 0 | 0 | 1 | 0 | 0 | 0 | 0 | ---FLAG |
| 2ND OCTET | | 0 | 1 | 1 | 0 | 0 | 0 | 1 | ---FOR DIVERSITY-EQUIPPED TYPE |
| 3RD OCTET | | 0 | 1 | 1 | 1 | 0 | 0 | 0 | ---FOR NON-DIVERSITY TYPE |

| SIGNALED VALUE (NON-DIVERSITY) | CONVERTED VALUE |
|---|---|
| 17dBμ | 10dBμ |
| 16dBμ | 9dBμ |
| 15dBμ | 8dBμ |
| 14dBμ | 7dBμ |
| 13dBμ | 6dBμ |
| 12dBμ | 5dBμ |

| | 8 | 7 | 6 | 5 | 4 | 3 | 2 | 1 |
|---|---|---|---|---|---|---|---|---|
| 1ST OCTET | | COMMUNICATION BER | | | | | | |
| 2ND OCTET | | COMMUNICATION OUT BER | | | | | | |

Fig.9B

```
1 1 0 0 0 0 0 ----- BER=10⁻¹
0 1 1 0 0 0 0 ----- BER=5×10⁻²
0 0 1 1 0 0 0 ----- BER=10⁻²
0 0 0 1 1 0 0 ----- BER=5×10⁻³
0 0 0 0 1 1 0 ----- BER=10⁻³
0 0 0 0 0 1 1 ----- BER=5×10⁻⁴
0 0 0 0 0 0 1 1 ----- BER=10⁻⁴
```

(BER values: $10^{-1}$, $5\times10^{-2}$, $10^{-2}$, $5\times10^{-3}$, $10^{-3}$, $5\times10^{-4}$, $10^{-4}$)

Fig.9C

| | 8 | 7 | 6 | 5 | 4 | 3 | 2 | 1 |
|---|---|---|---|---|---|---|---|---|
| 1ST OCTET | 0 | 0 | 0 | 0 | 1 | 1 | 0 | 0 |
| 2ND OCTET | 0 | 0 | 0 | 1 | 1 | 0 | 0 | 0 |

| SIGNALING INFORMATION 1 | SIGNALING INFORMATION 2 | SIGNALING INFORMATION n |
|---|---|---|
| STANDBY CONTROL INFORMATION 1 | STANDBY CONTROL INFORMATION 2 | STANDBY CONTROL INFORMATION n |

Fig.11B

BIT ASSIGNMENT

| BIT 8 | 7 | 6 | 5 | 4 | 3 | 2 | 1 | :KIND OF MESSAGE |
|---|---|---|---|---|---|---|---|---|
| 1 | 0 | 1 | 0 | 0 | 0 | 0 | 1 | :SIGNALING INFORMATION |
|   |   |   |   | 0 | 0 | 1 | 0 | :SIGNALING INFORMATION FOR NON-DIVERSITY TYPE |
|   |   |   |   | 0 | 0 | 1 | 1 | :SIGNALING INFORMATION FOR DIVERSITY EQIPPED TYPE |

MOBILE METHOD AND APPARATUS FOR STANDBY CONTROL IN A COMMUNICATION SYSTEM

BACKGROUND OF THE INVENTION

1. Field of the Invention

The present invention relates to a mobile communication system for performing standby control of mobile units for car telephones, portable telephones, etc.

Mobile units of various designs have been commercialized for mobile telephones such as car telephones and portable telephones, and an even wider variety of mobile units are expected to come into use in the future. For such a wide variety of mobile units, control must be performed to ensure the required communication quality.

2. Description of the Related Art

In a mobile communication system, standby control is performed to control whether a mobile unit is placed in a state (standby state) ready to receive service from a base station. For such standby control, standby control information containing data on a communication level and a communication out level is sent from the base station to each mobile unit to notify the mobile unit accordingly. The mobile unit that has received the standby control information reads the communication level and communication out level, and measures the reception level for comparison. When not in a standby state, if the reception level becomes greater than the communication level, the mobile unit goes into a standby state. Conversely, when in a standby state, if the reception level falls below the communication out level, the mobile unit goes out of the standby state.

In previous systems, the communication level and the communication out level have been set at respective fixed levels regardless of the performance of individual mobile units. However, with a mobile unit with improved reception performance by the use of a diversity reception technique, etc., a higher communication quality than is possible with an ordinary mobile unit not equipped with a diversity reception system can be obtained at the same reception level. The problem with previous systems has therefore been that a high-performance mobile unit does not enter a standby state even when the reception level is good enough to provide good communication quality for such a mobile unit, thus being unable to make full use of the high reception performance of the mobile unit.

SUMMARY OF THE INVENTION

It is an object of the invention to provide a method and apparatus for performing standby control that matches the reception performance of individual mobile units.

According to the present invention, there is provided a standby control method for a mobile unit, comprising the steps of: receiving signaling information containing standby control information from a base station; determining a reception level threshold value for standby control, based on the standby control information contained in the signaling information and on information concerning the reception performance of the mobile unit; measuring a reception level; comparing the measured reception level with the reception level threshold value; and controlling the standby state on the basis of the result of the comparison.

According to the present invention, there is also provided a standby control method for a mobile unit, comprising the steps of: receiving signaling information containing a bit error rate threshold value from a base station; reading out the bit error rate threshold value contained in the signaling information; measuring the bit error rate of a received signal; comparing the measured bit error rate with the bit error rate threshold value; and controlling the standby state on the basis of the result of the comparison.

According to the present invention, there is also provided an apparatus for standby control of a mobile unit, comprising: means for receiving signaling information containing standby control information from a base station; means for determining a reception level threshold value for standby control, based on the standby control information contained in the signaling information and on information concerning the reception performance of the mobile unit; means for measuring a reception level; means for comparing the measured reception level with the reception level threshold value; and means for controlling the standby state on the basis of the result of the comparison fed from the comparing means.

According to the present invention, there is also provided an apparatus for standby control of a mobile unit, comprising: means for receiving signaling information containing a bit error rate threshold value from a base station; means for reading out the bit error rate threshold value contained in the signaling information; means for measuring the bit error rate of a received signal; means for comparing the measured bit error rate with the bit error rate threshold value; and means for controlling the standby state on the basis of the result of the comparison fed from the comparing means.

DESCRIPTION OF THE PREFERRED EMBODIMENTS

Figure 1:
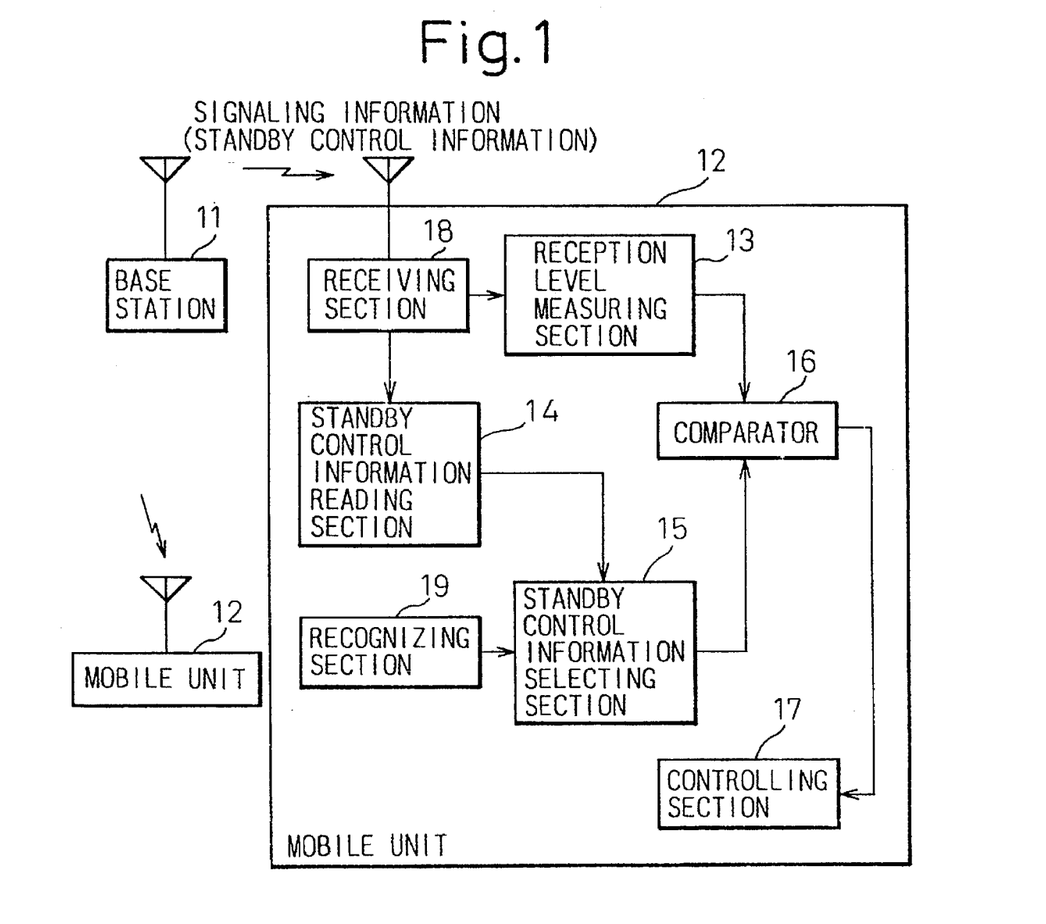
FIG. 1 is a block diagram showing a first embodiment of the present invention.

FIG. 1 is a diagram illustrating a first embodiment of the present invention, wherein multiple kinds of standby information that match the reception performance of multiple types of mobile unit are transmitted from a base station. In the figure, the numeral 11 is the base station, 12 is a mobile unit, 13 is a reception level measuring section, 14 is a standby control information reading section, 15 is a standby control information selecting section, 16 is a comparator, 17 is a controlling section, 18 is a receiving section, and 19 is a recognizing section. The mobile unit 12 is equipped with transmitting and receiving functions as with an ordinary mobile unit, but in the figure, the transmitter/receiver functional parts and communication functional parts are omitted, and only the essential parts are shown.

The base station 11 transmits signaling information Containing multiple kinds of standby control information. The mobile unit 12 located in the zone of the base station 11 receives the signaling information, and extracts from it appropriate standby control information, based on which standby control is performed. The signaling information contains multiple kinds of standby control information, each consisting of a synchronizing word, a color code identifying the base station 11, and a communication level and communication out level that match the reception performance of each type of mobile unit 12 based on whether it is equipped with a diversity reception system, etc.

Signals from the base station 11 are received by the receiving section 18 in the mobile unit 12; when not in communication mode, the mobile unit 12 receives signaling information from the base station 11, measures the reception level in the reception level measuring section 13, and applies the measured reception level, in binary form, to the comparator 16. Both the receiving section 18 and the reception level measuring section 13 can be constructed using known configurations. The standby control information contained in the signaling information received by the receiving section 18 is extracted by the standby control information reading section 14.

The recognizing section 19 is used to recognize the reception performance of the mobile unit based, for example, on information as to whether or not the mobile unit is equipped with a diversity control system. The recognizing section 19 can be implemented using a random-access memory (RAM), register, or the like in which information concerning the reception performance is stored. Based on the reception performance information stored in the recognizing section 19, the standby control information selecting section 15 selects the standby control information that matches the mobile unit 12 from among the multiple kinds of standby control information. The standby control information for each individual mobile unit can be easily selected by prearranging the multiple kinds of standby control information in the order corresponding to mobile unit reception performance types.

The comparator 16 compares the reception level measured by the reception level measuring section 13 with the communication level and communication out level contained in the standby control information selected by the standby control information selecting section 15. When the measured reception level becomes greater than the communication level, the controlling section 17 determines that the mobile unit 12 has entered the zone covered by the base station 11, and the mobile unit 12 is placed in a standby state; on the other hand, when the reception level falls below the communication out level, the controlling section 17 determines that the mobile unit 12 has moved outside the zone of the base station 11, and the standby state for the base station 11 is released. The standby control information selecting section 15, comparator 16, controlling section 17, etc., in the mobile unit 12 may be implemented using, for example, processing functions of a microprocessor.

Figure 2:
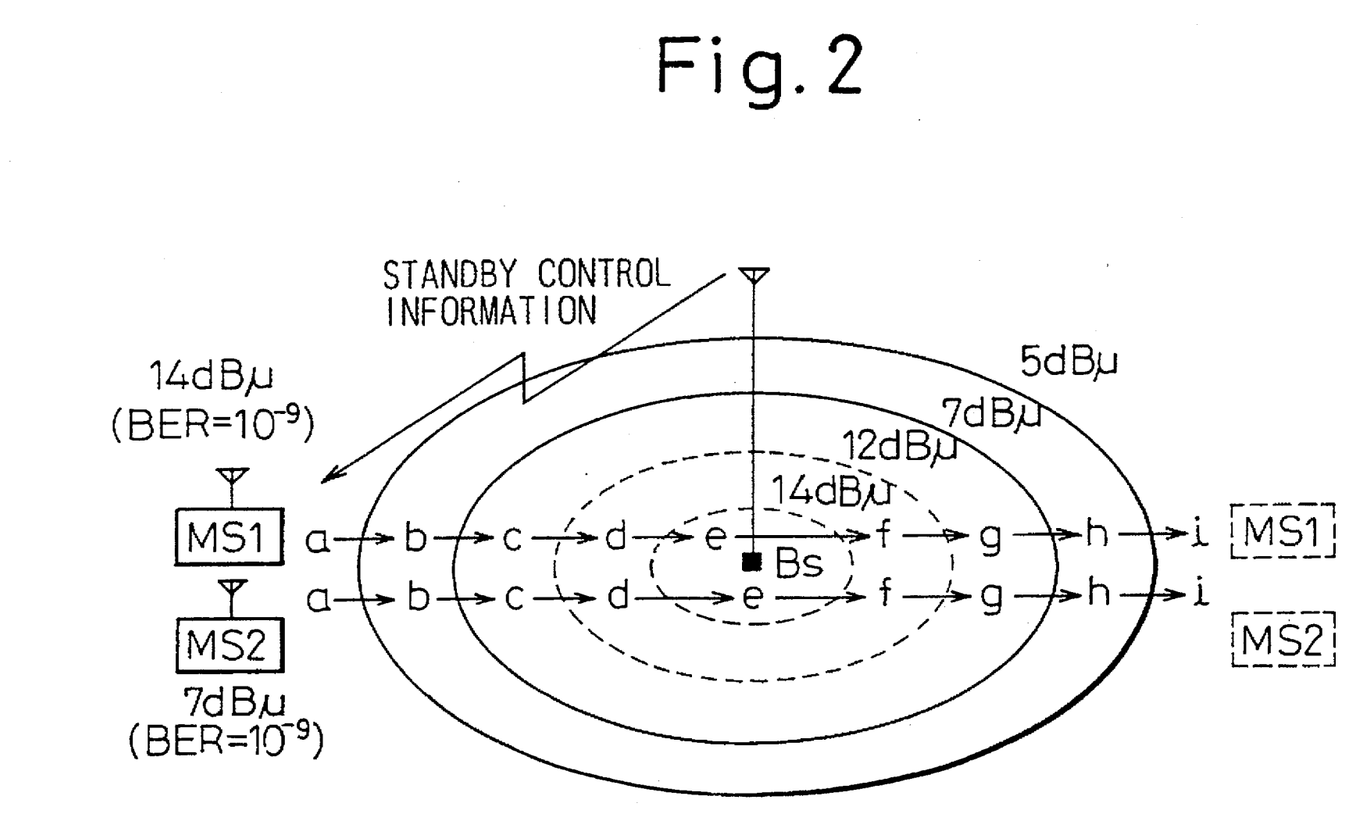
FIG. 2 is a diagram for explaining the operation of the present invention.

FIG. 2 is a diagram for explaining the standby control information in relation to areas; in the example shown, the base station BS transmits standby control information providing a communication level of 7 dBμ and communication out level of 5 dBμ for diversity-equipped mobile units, and a communication level of 14 dBμ and communication out level of 12 dBμ for non-diversity mobile units. Assuming that the bit error rate (BER) for a mobile unit MS1 without a diversity system is $10^{-3}$ at a reception level of 14 dBμ and that for a mobile unit MS2 equipped with a diversity system is $10^{-3}$ at a reception level of 7 dBμ, the operation of the mobile units MS1 and MS2, both moving along the path a→b→... →i, will be described below.

The recognizing section 19 (FIG. 1) in the mobile unit MS1 contains non-diversity reception performance information, while the recognizing section 19 in the mobile unit MS2 contains diversity reception performance information. Based on the reception performance information fed from the recognizing section 19, the standby control information selecting section 15 selects the appropriate standby control information from among the multiple kinds of standby control information according to whether or not the mobile unit is equipped with a diversity system. At position a, for example, since the reception level of both mobile units MS1, and MS2 is below the respective communication out levels and communication levels, the controlling section 17 in each mobile unit determines that the mobile unit is outside the zone of the base station BS, and neither of the mobile units is placed in a standby state for the base station BS.

At position b, the mobile unit MS1 is judged as being outside the zone since its reception level is below both the communication out level and communication level, and the mobile unit MS2 is also judged as being outside the zone since its reception level is below the communication level, though it is greater than the communication out level. At position c, the reception level of the mobile unit MS1 is still below both the communication out level and communication level, so that the mobile unit MS1 is judged as being outside the zone; on the other hand, the reception level of the mobile unit MS2 is greater than the communication level, so that the mobile unit MS2 is judged as having entered the zone and is therefore placed in a standby state.

At position d, the reception level of the mobile unit MS1 is greater than the communication out level but is still below the communication level, so that the mobile unit MS1 is judged as being outside the zone; on the other hand, the reception level of the mobile unit MS2 stays greater than both the communication out level and communication level, so that the mobile unit MS2 remains in the standby state. At position e, since the reception level of the mobile unit MS1 is greater than the communication level, the mobile unit MS1 is now judged as having entered the zone and is placed in a standby state, while the mobile unit MS2 remains in the standby state since its reception level stays greater than both the communication level and communication out level.

At position f, the reception level of the mobile unit MS1 falls below the communication level but is greater than the communication out level, so that the mobile unit MS1 remains in the standby state; the mobile unit MS2 also remains in the standby state since its reception level stays greater than both the communication level and communication out level. At position g, since the reception level of the mobile unit MS1 falls below the communication out level, the mobile unit MS1 is judged as having moved outside the zone, while the mobile unit MS2 remains in the standby state since its reception level stays greater than both the communication level and communication out level.

At position h, the mobile unit MS1 is judged as being outside the zone since its reception level is below both the communication level and communication out level; on the other hand, the reception level of the mobile unit MS2 falls below the communication level but still stays greater than the communication out level, so that the MS2 remains in the standby state. At position i, the mobile unit MS1 is judged as being outside the zone since its reception level is below both the communication level and communication out level, as at positions g and h; on the other hand, the reception level of the mobile unit MS2 falls below the communication out level, and the MS2 is now judged as having moved outside the zone.

As described above, the area where the standby state is to be enabled is judged according to the reception performance of the mobile units MS1 and MS2, and each mobile unit can be controlled for standby in an area where the required communication quality is provided, in a manner that matches differences in reception performance due to the presence or absence of diversity control.

Figure 3A:
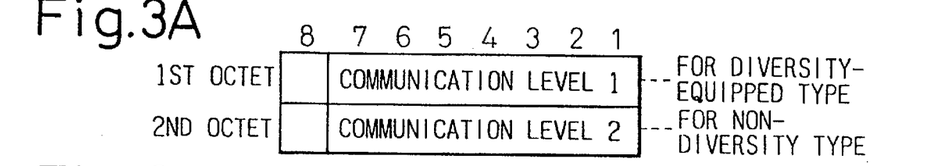
FIGS. 3A to 3E are diagrams for explaining standby control information.
Figure 3B:
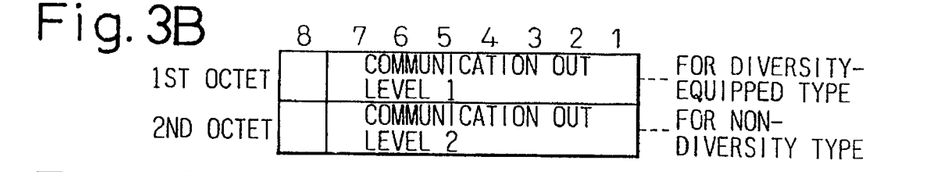
Figure 3C:
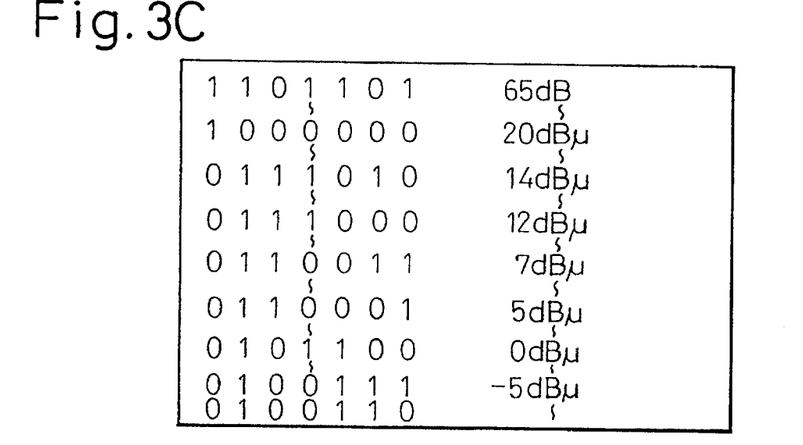
Figure 3D:
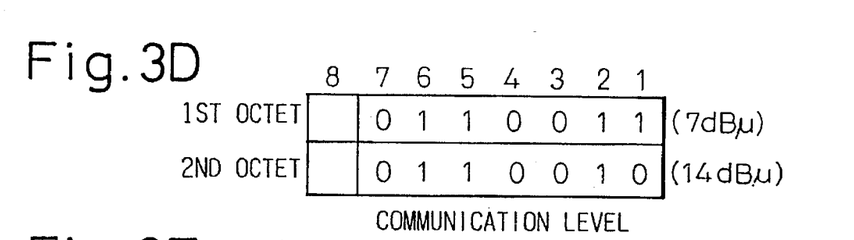
Figure 3E:
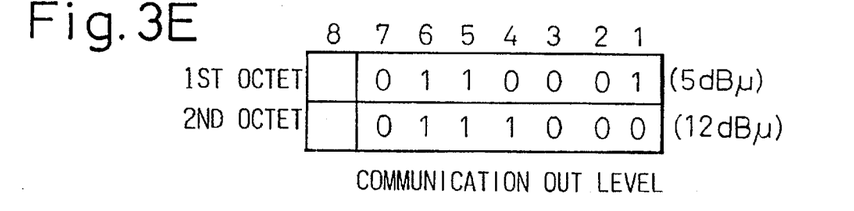

FIGS. 3A and 3B show an example of a standby control information format in which the values of the communication and communication out levels for different reception performance types are directly transmitted from the base station to mobile units. When there are two types of mobile units with different reception performance characteristics, such as diversity-equipped mobile units and non-diversity mobile units, two kinds of communication levels and two kinds of communication out levels are transmitted in binary code form from the base station to the mobile units. For example, if the relationships between the reception levels and the binary strings output from the reception level measuring section 13 are as shown in FIG. 3C, the values of the communication/communication out levels are binary coded with the same scale as that shown in FIG. 3C. Suppose that the communication and communication out levels transmitted from the base station are as shown in FIGS. 3D and 3E. In this case, the standby control information selecting section 15 (FIG. 2) of the mobile unit MS1 extracts the second-octet communication level 0110010 (corresponding to 14 dBµ) and communication out level 0111000 (corresponding to 12 dBµ) from the standby control information, while the standby control information selecting section 15 of the mobile unit MS2 extracts the first-octet communication level 0110011 (corresponding to 7 dBµ) and communication out level 0110001 (corresponding to 5 dBµ) from the standby control information. The measured reception level in binary code form is compared with the respective levels.

Figure 4A:
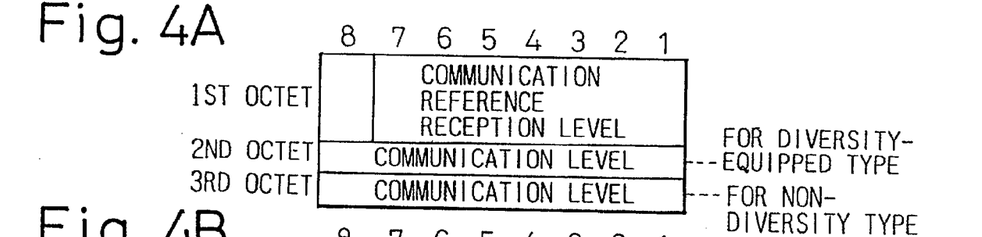
FIGS. 4A to 4E are diagrams for explaining standby control information represented by reference levels and differences.
Figures 4B, 4D:
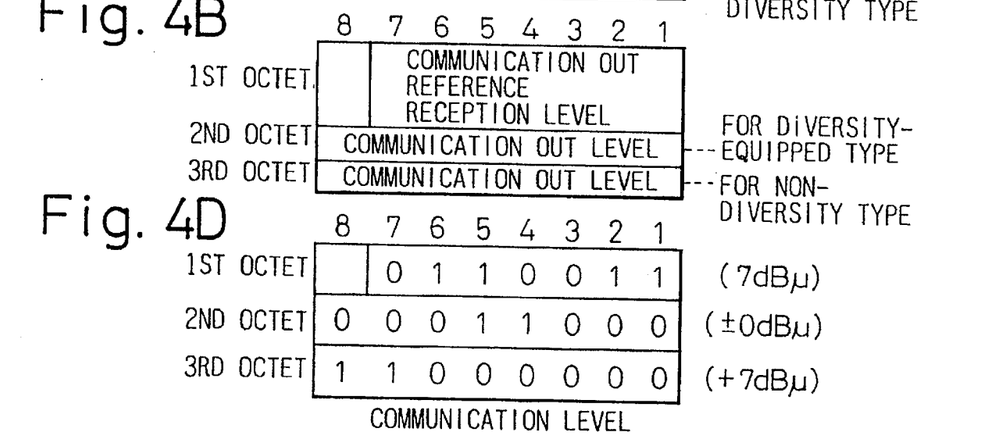
Figure 4C:
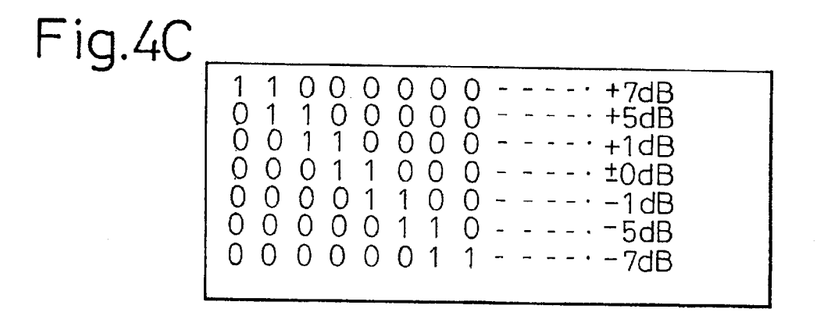
Figure 4E:
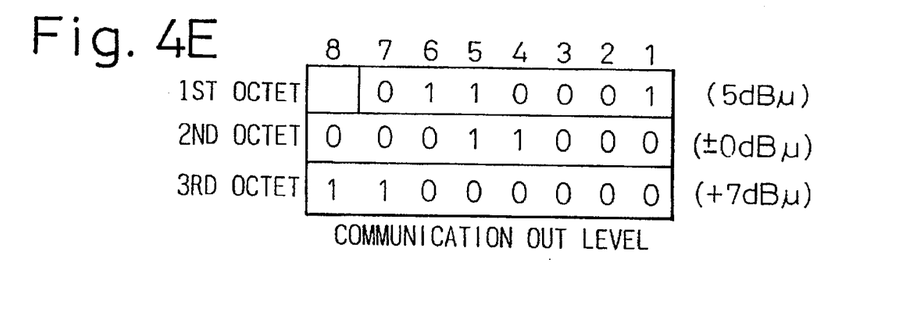

FIGS. 4A and 4B show an example of a standby control information format in which the communication and communication out levels for different reception performance types are transmitted from the base station to each mobile unit as data represented by reference values and differences from the reference values. In this format, the standby control information contains the communication reference reception level and the difference values representing the communication levels for different reception performance types, as well as the communication out reference reception level and the difference values representing the communication out levels for different reception performance types. In this case, the reference reception levels, for example, are binary coded using the same scale as the measured values, and the differences are encoded as shown in FIG. 4C. The example shown in FIGS. 3D and 3E can be expressed as shown in FIGS. 4D and 4E using the above method of representation.

Each mobile unit that has received the standby control information adds the difference value, according to the diversity or non-diversity type, to the communication reference reception level to obtain the communication level that matches its reception performance type. In like manner, the difference value according to the diversity or non-diversity type is added to the communication out reference reception level to obtain the applicable communication out level. Alternatively, the communication and communication out levels for diversity-equipped mobile units, for example, may be taken as the communication and communication out reference reception levels, and the communication and communication out levels for non-diversity mobile units may be transmitted as values relative to the reference values. That is, the standby control information for one of the different performance types may be taken as the reference, and the standby control information for mobile units of other performance types may be expressed as relative values.

Figure 5A:
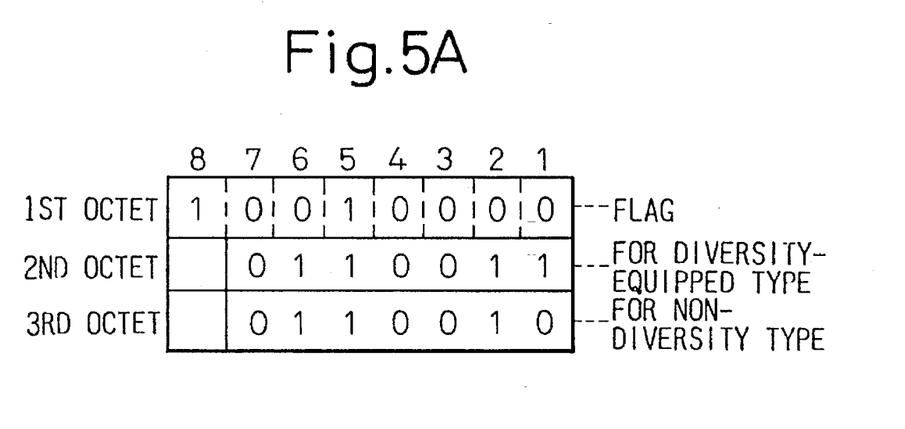
FIGS. 5A and 5B are diagrams for explaining standby control information of a variable-length format.
Figure 5B:
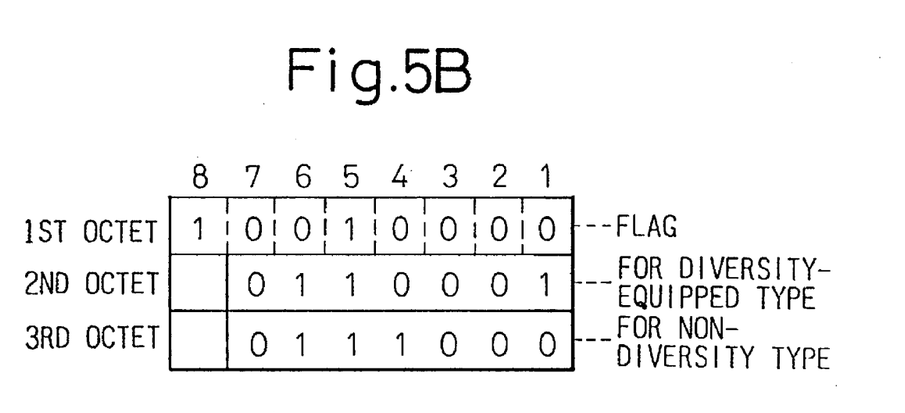

In the examples so far described, the standby control information is of a fixed length; alternatively, a variable-length format may be used as shown in FIGS. 5A and 5B. The flags set in the high-order bit position and the fourth bit position in the first octet indicate that the data for first and fourth types of mobile units are stored in the second and third octets, respectively.

Figure 6:
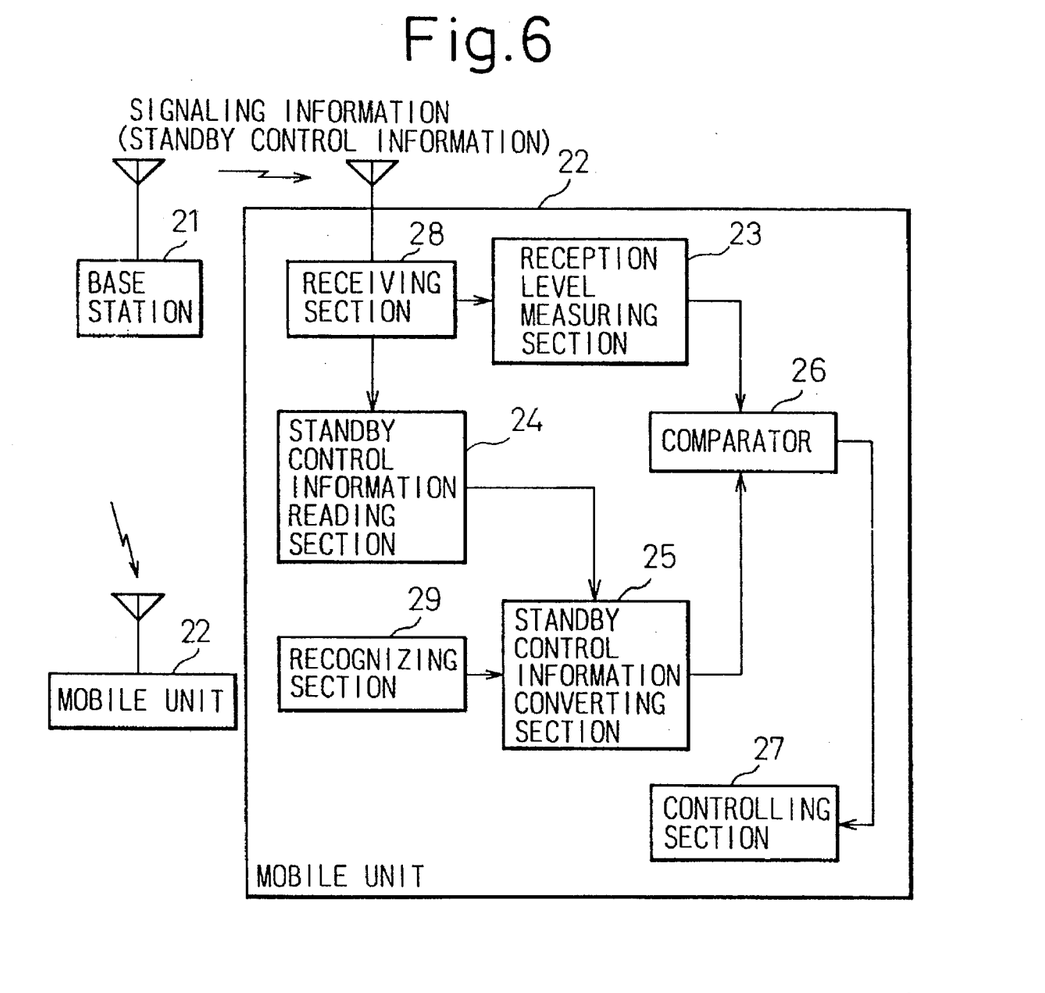
FIG. 6 is a block diagram showing a second embodiment of the present invention.

FIG. 6 is a diagram illustrating a second embodiment of the present invention, wherein the base station transmits only one kind of standby control information and each individual mobile unit converts it according to its reception performance. In the figure, the numeral 21 is the base station, 22 is a mobile unit, 23 is a reception level measuring section, 24 is a standby control information reading section, 25 is a standby control information converting section, 26 is a comparator, 27 is a controlling section, 28 is a receiving section, and 29 is a recognizing section.

The standby control information from the base station 21 consists of a communication level and a communication out level applicable, for example, for non-diversity mobile units. In the case of a non-diversity mobile unit, the received communication and communication out levels are not converted by the standby control information converting section 25 but are directly applied to the comparator 26 for comparison with the reception level measured by the reception level measuring section 23. On the other hand, in the case of a diversity-equipped mobile unit, the communication and communication out levels for non-diversity mobile units are converted by the standby control information converting section 25 into the communication and communication out levels that match the reception performance of diversity-equipped mobile units.

Figure 7:
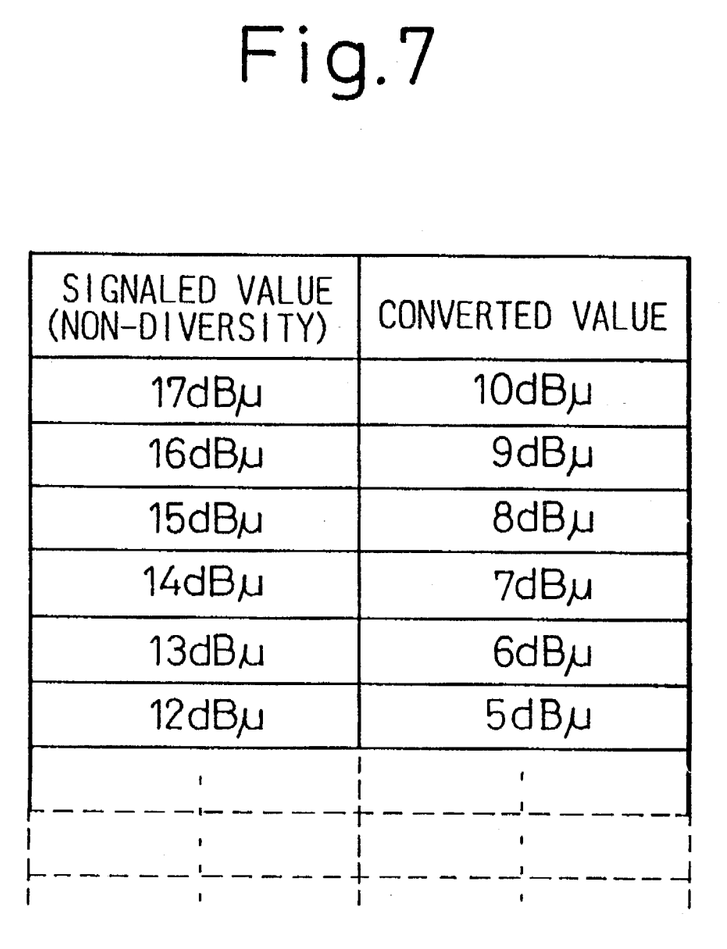
FIG. 7 is a diagram showing a conversion table for standby control information.

For example, a conversion table, such as shown in FIG. 7, is provided; when the communication level for non-diversity mobile units is 14 dBµ, a diversity-equipped mobile unit converts it into a communication level of 7 dBµ. In like manner, when the communication out level is 12 dBµ, the diversity-equipped mobile unit converts it into a communication out level of 5 dBµ. In an alternative configuration, standby control information for diversity-equipped mobile units is transmitted, and conversion is made in non-diversity mobile units. Furthermore, in a configuration where the standby control information is expressed in terms of difference values, the difference values are converted into the communication and communication out levels by the standby control information converter 25 in both diversity-equipped and non-diversity mobile units.

Figure 8:
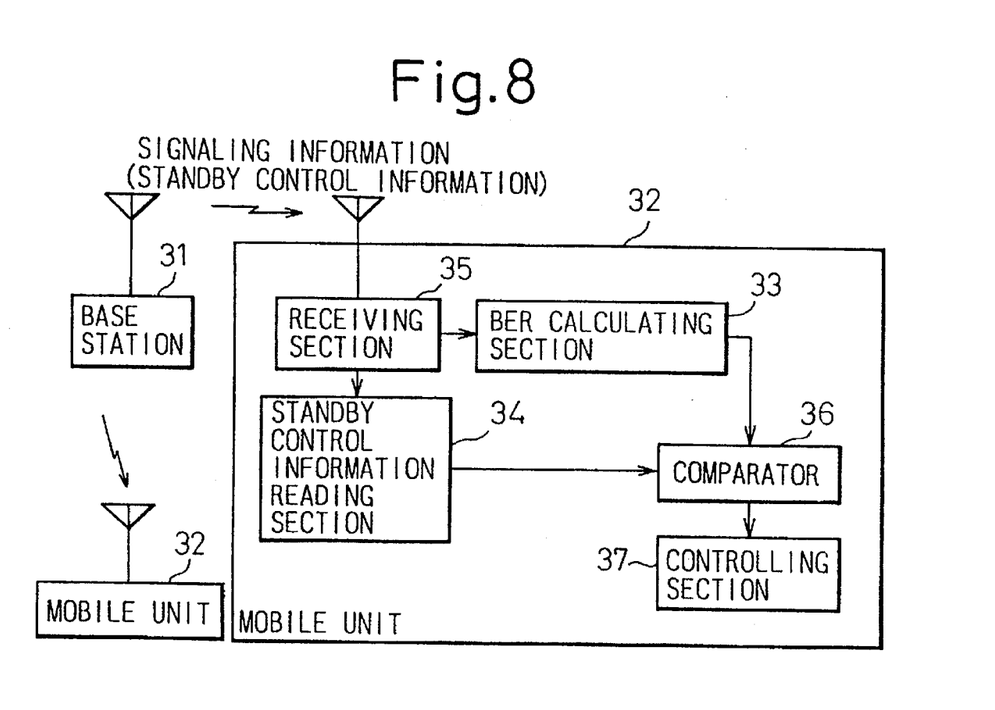
FIG. 8 is a block diagram showing a third embodiment of the present invention.

FIG. 8 is a diagram illustrating a third embodiment of the present invention, wherein the numeral 31 is a base station, 32 is a mobile unit, 33 is a BER calculating section, 34 is a standby control information reading section, 35 is a receiving section, 36 is a comparator, and 37 is a controlling section. In this embodiment, the base station 31 transmits standby control information represented by the bit error rates BERs corresponding to the communication and communication out levels. In this configuration, with the same bit error rate, the same communication quality can be obtained; that is, if the mobile unit 32 has good reception performance, the required bit error rate can be obtained even when the reception level is low. This allows the use of only one kind of standby control information represented by the bit error rates.

In the mobile unit 32, the reception bit error rate is calculated by the BER calculating section 33 by using, for example, a synchronizing word, color code, and other specific patterns contained in the signaling information or the error check bits for the signaling information received and demodulated by the receiving section 35. From the signaling information received and demodulated by the receiving section 35, the standby control information is extracted by the standby control information reading section 34, and the bit error rates corresponding to the communication and communication out levels are fed into the comparator 36. Under the control of the controlling section 37, the mobile unit 32 is placed into a standby state when the reception bit error rate becomes smaller than the communication bit error rate, and is released from the standby state when the reception bit error rate becomes greater than the communication out bit error rate.

Figure 9A:
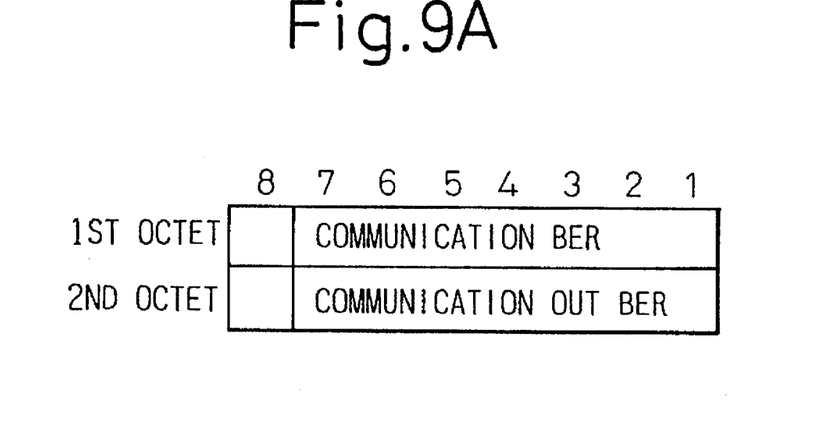
FIGS. 9A to 9C are diagrams for explaining standby control information using BER.
Figure 9B:
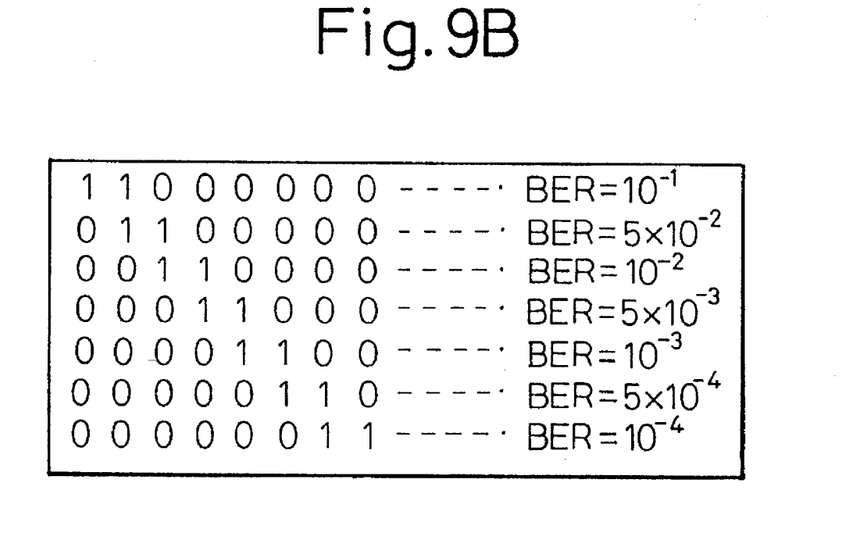
Figure 9C:
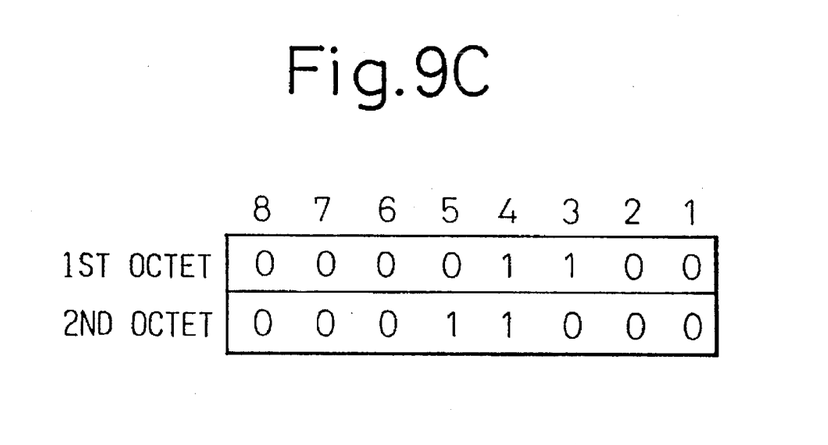

FIG. 9A is a diagram for explaining the standby control information using bit error rates (BERs). Even when there exist mobile units of different reception performance characteristics, such as diversity-equipped mobile units and non-diversity mobile units, the base station transmits standby control information consisting of the communication BER and communication out BER common to all types of mobile unit. An example of BER bit assignment is shown in FIG. 9B. When the communication BER is $10^{-3}$ and the communication out BER is $5 \times 10^{-3}$, the format is as shown in FIG. 9C.

For example, the reception level at BER=$10^{-3}$ is 7 dBμ for diversity-equipped mobile units and 14 dBμ for non-diversity mobile units; in this case, when the reception level is 7 dBμ or higher, a diversity-equipped mobile unit enters a standby state since the reception bit error rate calculated by the BER calculating section 33 is $10^{-3}$ or less. In the case of a non-diversity mobile unit, on the other hand, when the reception level is 7 dBμ, the reception bit error rate calculated by the BER calculating section 33 is larger than $10^{-3}$, and therefore, the mobile unit is not allowed to enter a standby state. Thus, the area where the standby state is to be enabled is automatically set according to the reception performance of the mobile unit.

Figure 10:
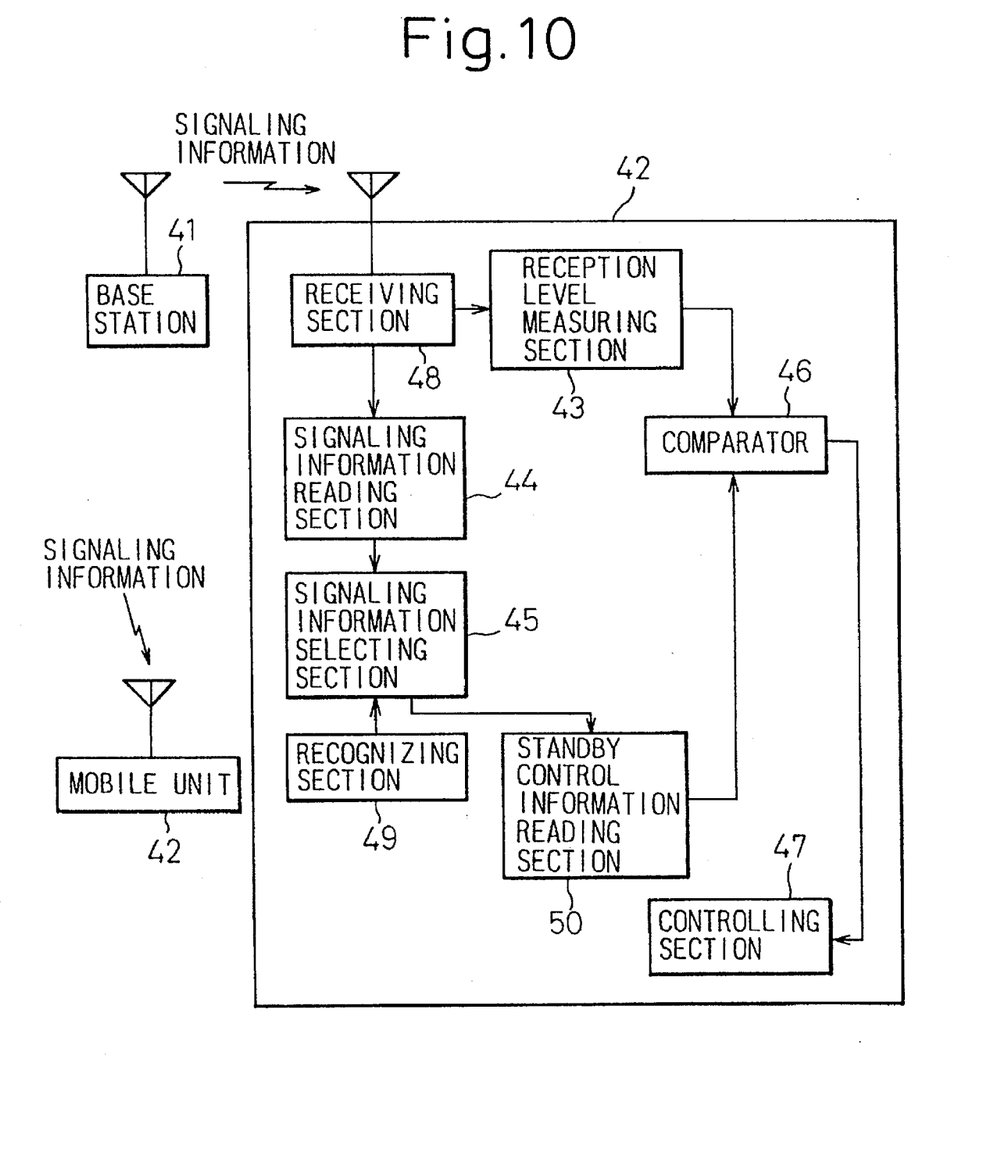
FIG. 10 is a block diagram showing a fourth embodiment of the present invention.

FIG. 10 is a diagram illustrating a fourth embodiment of the present invention, wherein multiple kinds of signaling information for mobile units of different performance types are transmitted to each mobile unit. In the figure, the numeral 41 is a base station, 42 is a mobile unit, 43 is a reception level measuring section, 44 is a signaling information reading section, 45 is a signaling information selecting section, 46 is a comparator, 47 is a controlling section, 48 is a receiving section, 49 is a recognizing section, and 50 is a standby control information reading section.

Figure 11A:
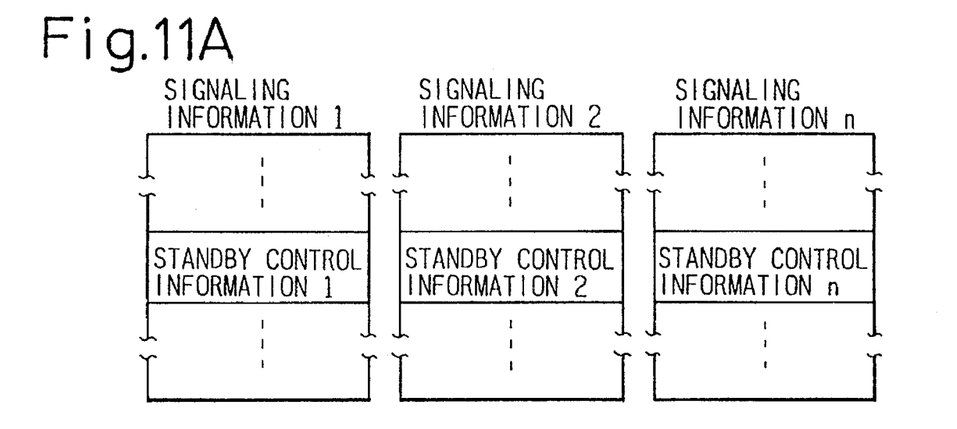
FIG. 11A to 11D are diagrams for explaining multiple kinds of signaling information.
Figure 11B:
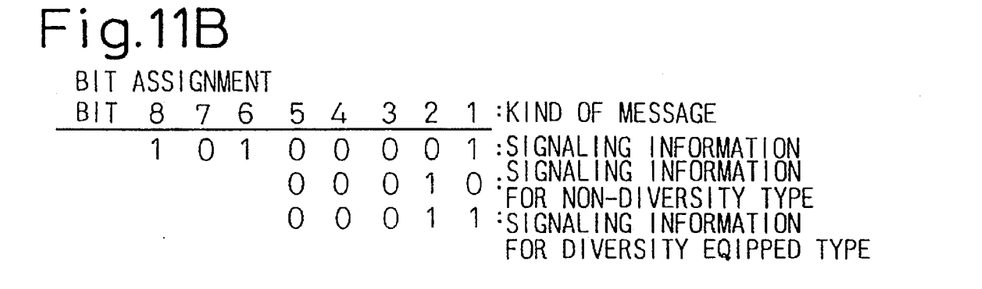
Figure 11C:
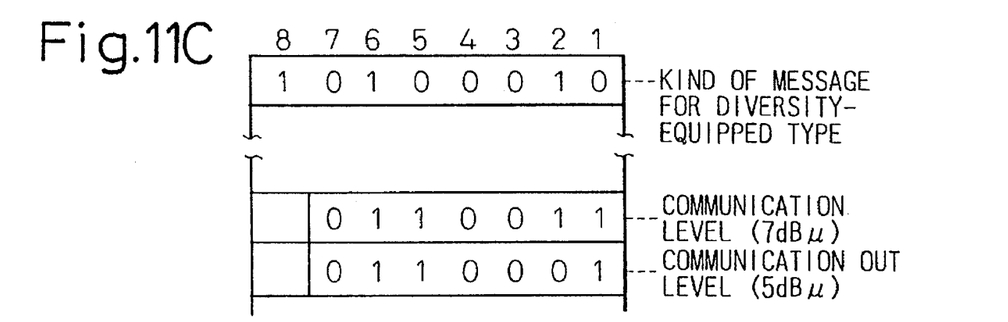
Figure 11D:
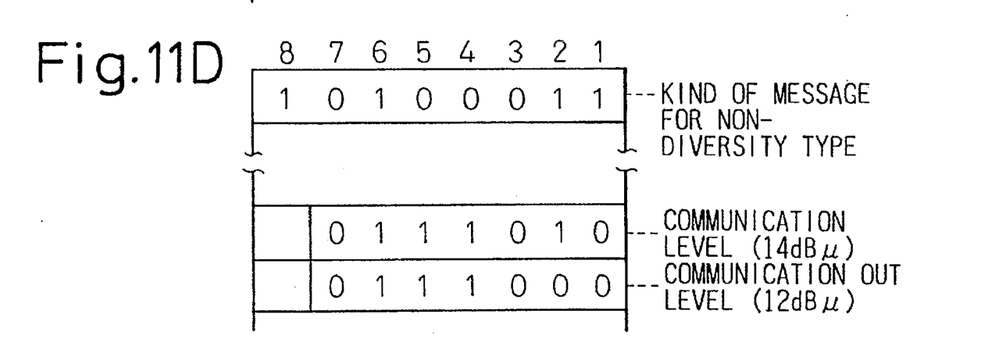

FIG. 11A shows an example of multiple kinds of signaling information. The base station 41 transmits multiple kinds of signaling information 1 to n. The multiple kinds of signaling information, 1 to n, contain standby control information, 1 to n, respectively. As shown in FIGS. 11C and 11D, the signaling information for diversity-equipped units includes a kind-of-message string "10100010", and that for non-diversity units includes a kind-of-message string "10100011" in accordance with the bit assignment shown in FIG. 11B.

In a diversity-equipped mobile unit, the signaling information received and demodulated by the receiving section 48 is read out by the signaling information reading section 44, and the signaling information having the kind-of-message string "10100010" for diversity-equipped units is selected by the signaling information selecting section 45. The standby control information reading section 50 reads the communication level "0110011" (7 dBμ) and communication out level "0110001" (5 dBμ) from the selected signaling information, and applies them to the comparator 46.

In the case of a non-diversity mobile unit, the signaling information selecting section 45 selects the signaling information having the kind-of-message string "10100011". The standby control information reading section 50 reads out the communication level "0111010" (14 dBμ) and communication out level "0111000" (12 dBμ) from the selected signaling information, and applies them to the comparator 46.

Thus, with the multiple kinds of signaling information received from the base station 41, each of mobile units of different reception performance characteristics can perform standby control that matches its reception performance.

The present invention is not limited to the aforementioned embodiments, but various modifications can be made in the invention. For example, standby control information using bit error rates may be prepared in multiple kinds so that standby control for mobile units that can tolerate lower communication quality and standby control for mobile units that need the specified communication quality can be performed separately. In the format using bit error rates also, the communication bit error rate and the communication out bit error rate may be transmitted as differences relative to reference values.

I claim:

1. A standby control method for a mobile unit, comprising the steps of:
   a) receiving signaling information containing standby control information from a base station;
   b) determining a reception level threshold value for standby control, based on the standby control information contained in the signaling information and on information concerning the reception performance of the mobile unit;
   c) measuring a reception level;
   d) comparing the measured reception level with the reception level threshold value; and
   e) controlling standby state on the basis of the result of the comparison,
   wherein the standby control information includes a plurality of reception level threshold values corresponding to a plurality of mobile unit reception performance types, and step b) includes substeps of
   i) reading out the plurality of reception level threshold values, and
   ii) selecting one of the plurality of reception level threshold values on the basis of the information concerning the reception performance of the mobile unit, and thereby determining the reception level threshold value for standby control.

2. A standby control method for a mobile unit, comprising the steps of:

a) receiving signaling information containing standby control information from a base station;

b) determining a reception level threshold value for standby control, based on the standby control information contained in the signaling information and on information concerning the reception performance of the mobile unit;

c) measuring a reception level;

d) comparing the measured reception level with the reception level threshold value; and e) controlling standby state on the basis of the result of the comparison, wherein the standby control information includes a reception level threshold value corresponding to a reference mobile unit reception performance type, and step b) includes the substeps of i) reading out the reception level threshold value, and ii) converting the read-out reception level threshold value into a reception level threshold value corresponding to the reception performance of the mobile unit.

3. A standby control method for a mobile unit, comprising the steps of:

a) receiving signaling information containing standby control information from a base station;

b) determining a reception level threshold value for standby control, based on the standby control information contained in the signaling information and on information concerning the reception performance of the mobile unit;

c) measuring a reception level;

d) comparing the measured reception level with the reception level threshold value; and e) controlling standby state on the basis of the result of the comparison, wherein in step a), multiple kinds of signaling information, each containing a reception level threshold value, are received, and step b) includes the substeps of i) selecting one of the multiple kinds of signaling information on the basis of the information concerning the reception performance of the mobile unit, and ii) reading out the reception level threshold value contained in the selected signaling information.

4. An apparatus for standby control of a mobile unit, comprising:

means for receiving signaling information containing standby control information from a base station;

means for determining a reception level threshold value for standby control, based on the standby control information contained in the signaling information and on information concerning the reception performance of the mobile unit;

means for measuring a reception level;

means for comparing the measured reception level with the reception level threshold value; and means for controlling standby state on the basis of the result of the comparison fed from the comparing means, wherein the standby control information includes a plurality of reception level threshold values corresponding to a plurality of mobile unit reception performance types, and the reception level threshold value determining means includes means for reading out the plurality of reception level threshold values, and means for selecting one of the plurality of reception level threshold values on the basis of the information concerning the reception performance of the mobile unit, and thereby determining the reception level threshold value for standby control.

5. An apparatus for standby control of a mobile unit, comprising:

means for receiving signaling information containing standby control information from a base station;

means for determining a reception level threshold value for standby control, based on the standby control information contained in the signaling information and on information concerning the reception performance of the mobile unit;

means for measuring a reception level;

means for comparing the measured reception level with the reception level threshold value; and means for controlling standby state on the basis of the result of the comparison fed from the comparing means, wherein the standby control information includes a reception level threshold value corresponding to a reference mobile unit reception performance type, and the reception level threshold value determining means includes means for reading out the reception level threshold value, and means for converting the read-out reception level threshold value into a reception level threshold value corresponding to the reception performance of the mobile unit.

6. An apparatus for standby control of a mobile unit, comprising:

means for receiving signaling information containing standby control information from a base station;

means for determining a reception level threshold value for standby control, based on the standby control information contained in the signaling information and on information concerning the reception performance of the mobile unit;

means for measuring a reception level;

means for comparing the measured reception level with the reception level threshold value; and means for controlling standby state on the basis of the result of the comparison fed from the comparing means, wherein the signaling information receiving means receive multiple kinds of signaling information, each containing a reception level threshold value, and the reception level threshold value determining means includes means for selecting one of the multiple kinds of signaling information on the basis of the information concerning the reception performance of the mobile unit, and means for reading out the reception level threshold value contained in the selected signaling information.

* * * * *